United States Patent
Bohner et al.

(10) Patent No.: US 6,220,385 B1
(45) Date of Patent: Apr. 24, 2001

(54) STEERING SYSTEM

(75) Inventors: Hubert Bohner, Boeblingen; Martin Moser, Fellbach, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/402,627

(22) PCT Filed: Feb. 2, 1999

(86) PCT No.: PCT/EP99/00683

§ 371 Date: Feb. 14, 2000

§ 102(e) Date: Feb. 14, 2000

(87) PCT Pub. No.: WO99/39967

PCT Pub. Date: Aug. 12, 1999

(30) Foreign Application Priority Data

Feb. 7, 1998 (DE) .............................. 198 05 015

(51) Int. Cl.⁷ .................................................. B62D 5/30
(52) U.S. Cl. .......................... 180/403; 180/404; 180/405
(58) Field of Search ................................... 180/402, 403, 180/404, 405, 406, 407

(56) References Cited

U.S. PATENT DOCUMENTS

| | | | |
|---|---|---|---|
| 3,580,352 | * 5/1971 | Hestad et al. ........................ 180/402 |
| 4,940,105 | * 7/1990 | Matsunaga et al. .................. 180/404 |
| 5,236,335 | * 8/1993 | Takeuchi et al. ..................... 180/446 |
| 5,511,629 | * 4/1996 | Vogel .................................... 180/447 |
| 6,076,627 | * 6/2000 | Bohner et al. ........................ 180/422 |
| 6,138,788 | * 10/2000 | Bohner et al. ........................ 180/405 |

FOREIGN PATENT DOCUMENTS

19540956 C1   11/1995  (DE) .

* cited by examiner

Primary Examiner—Kevin Hurley
(74) Attorney, Agent, or Firm—Evenson, McKeown, Edwards & Lenahan, P.L.L.C.

(57) ABSTRACT

A steering system for a motor vehicle is not trackbound and has steered vehicle wheels which are connected only operationally in normal operation to a steering handwheel via an electronic control arrangement which actuates a steering actuator in accordance with a desired-value stipulation by way of the steering handwheel. In emergencies, a mechanical positive coupling becomes effective between the steering handwheel and the steered vehicle wheels. The operational state of the clutch is monitored by a sensor system in the case of normal operation, with the result that the normal operation can remain switched on only if the clutch is unambiguously open.

14 Claims, 3 Drawing Sheets

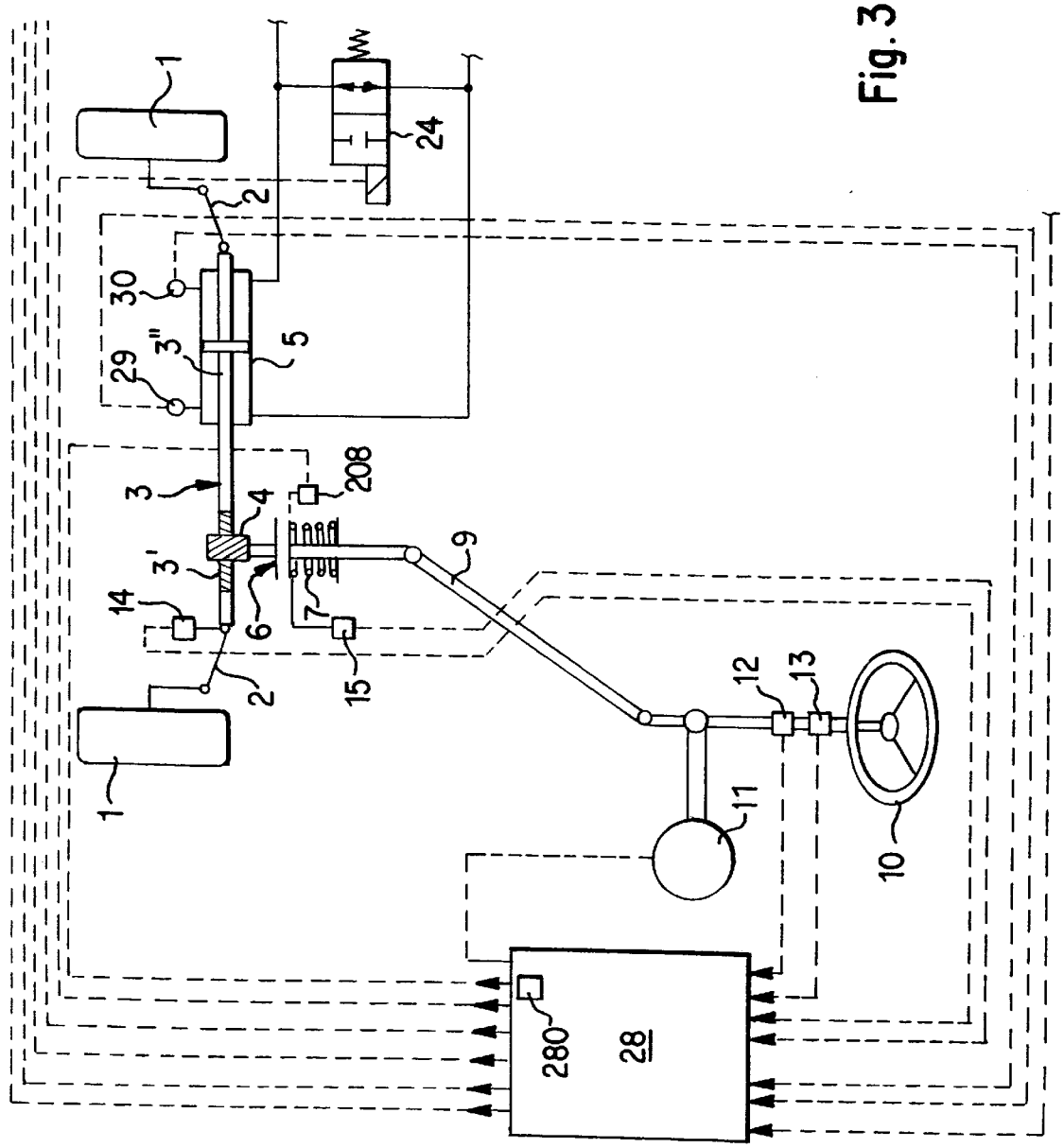

STEERING SYSTEM

CROSS-REFERENCE TO RELATED APPLICATION

This application is related to PCT International Application No. PCT/EP99/00683 filed on Feb. 2, 1999.

BACKGROUND AND SUMMARY OF THE INVENTION

The present invention relates to a steering system for a motor vehicle which is not trackbound and whose steered vehicle wheels are operationally connected in normal operation to a steering handle or a steering handwheel via an electronic control arrangement which continuously checks for correct functioning and controls a steering actuator, connected with the steered vehicle wheels so as to adjust them for steering, and connected for this purpose to a steering angle desired-value sensor actuated by the steering handle or the steering handwheel and to a steering angle actual-value sensor actuated by the steered vehicle wheels. The control arrangement preferably also controls a hand-force setter connected to the steering handle or the steering handwheel so as to simulate a steering resistance, and for this purpose is connected to a hand-force desired-value sensor detecting transmitted forces between the steering actuator and steered vehicle wheels, and to a hand-force actual-value sensor detecting transmitted forces between the hand-force setter and steering handwheel, in the case of abnormal operation or emergency operation are mechanically positively coupled to the steering handle or the steering handwheel for the purpose of steering adjustment by the closure of a clutch open in normal operation, in a mechanical steering gear arrangement arranged between the steering handle or steering handwheel and steered vehicle wheels.

A known steering system is described in DE 195 46 733 C1 and DE 690 22 848 T2.

Furthermore, DE 39 19 990 A1 discloses a steering system in which automatic steering corrections can be performed, for example in the case of a side wind.

DE 37 14 833 A1 relates to a power steering system with a hydraulic and electric servomotor, the electric servomotor being switched to act via a clutch in the event of failure of the hydraulic servomotor.

Steering systems which operate using the "steer by wire" concept, at least in the case of normal operation, are being developed for future motor vehicles. Such systems offer the basic advantage that they are suitable for the most diverse vehicles without design modifications, at least with regard to the control arrangement and the associated sensor system. On the one hand, it is possible by means of appropriate programming to implement virtually any transmission ratio between the stroke of the steering handle and the steering angle change of the steered vehicle wheels. It is, moreover, possible to connect the control arrangement to additional sensors in order automatically to take account of or compensate parameters, for example side wind influences, to be prescribed.

In order to be able to ensure the required measure of safety in the case of system faults, it can be provided that upon the occurrence of a fault in the control arrangement, or upon the failure of signals which are evaluated by the control arrangement, an operating mode for abnormal operation or emergency operation is automatically switched on. In this mode of operation, it is then possible to provide positive coupling between the steering handle and steered vehicle wheels, with the result that the steering system operates in principle like a conventional steering system, although the mechanical steering column customary in conventional steering systems can, if appropriate, be replaced by other mechanical systems or else by hydraulic, in particular hydrostatic, systems.

It is the object of the invention to ensure increased safety for the "steer by wire" operation.

This object is achieved according to the invention by virtue of the fact that a sensor system is present for detecting the open state of the clutch.

The possibility of the occurrence of critical operating states owing to defective closure of the clutch can thereby be avoided. In the case of a steering system of the type described above, there is regularly a different transmission ratio between the stroke of the steering handle and the steering angle change of the steered vehicle wheels with the clutch closed to with the clutch open, that is to say in the case of normal operation. If during this normal operation the clutch were to close completely or partially in an unnoticed fashion, actuating movements of the steered vehicle wheels could lead to an undesired effect on the steering angle desired-value sensor, with the result that the electronic control arrangement then attempts to undertake a corresponding adjustment of the steered vehicle wheels, the consequence then being renewed adjustment of the steering angle desired-value sensor. Substantial instances of maloperation can "escalate" as a result.

In accordance with a particularly preferred embodiment of the invention, it is provided that the steering system switches over automatically to abnormal operation or emergency operation when during normal operation a signal for the open state of the clutch vanishes and/or a signal for a closed or closing clutch occurs.

It is expedient in this regard if the clutch is continuously subjected to a closing force, that is to say continuously forced into its closed state, and can be opened against the closing force by an actuator, rendered effective only by the supply of energy.

A particularly high degree of safety is ensured in that the steering handle and steered vehicle wheels are positively coupled to one another, and abnormal operation or emergency operation is switched on as soon as the sensor system "notices" that no unambiguous signal for an open clutch is present in normal operation.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic representation similar to FIG. 1 but of an embodiment in which an electromagnetically actuated clutch is provided instead of a hydraulic clutch actuation.

DETAILED DESCRIPTION OF THE DRAWINGS

Figure 1:
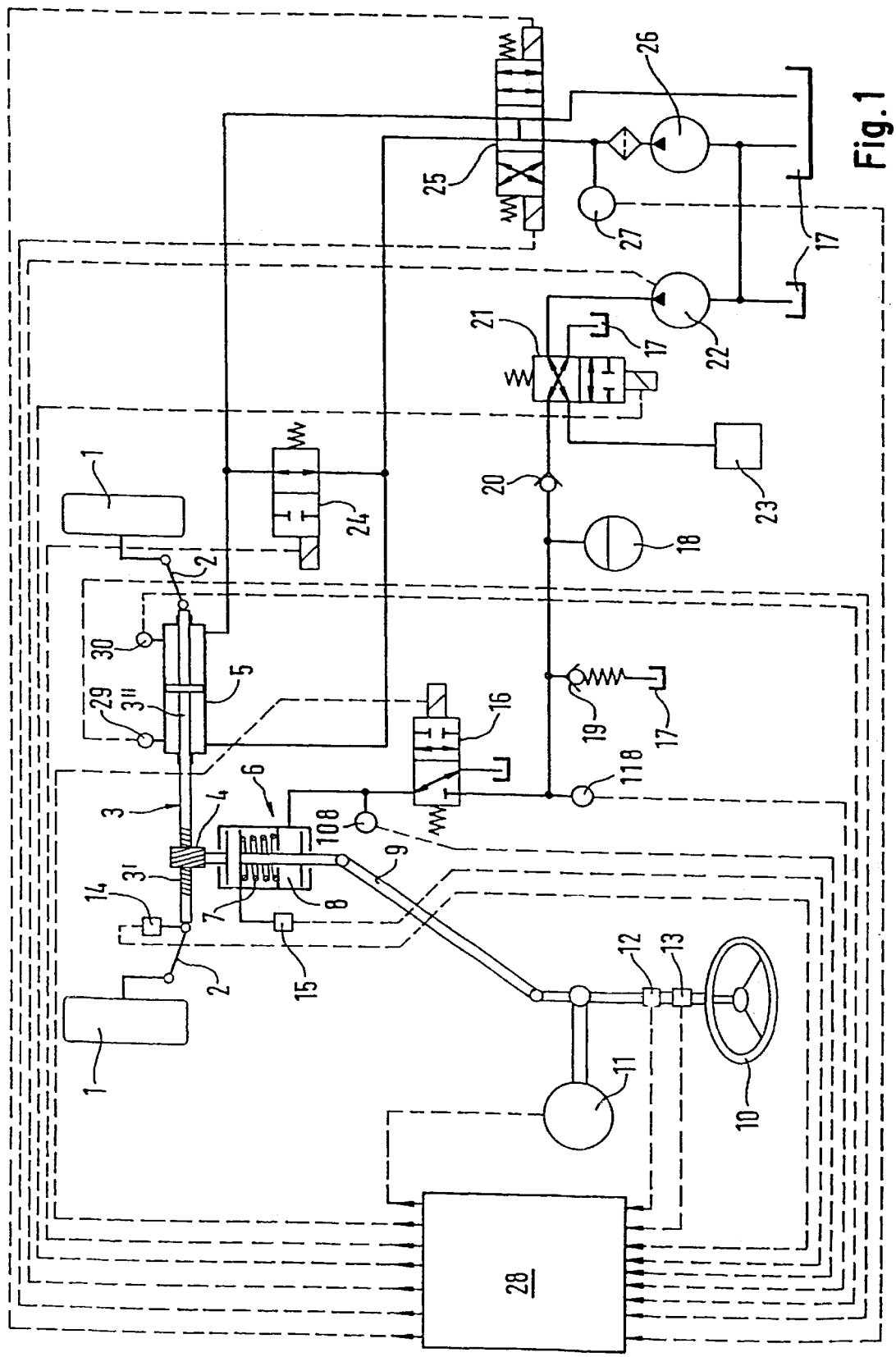
FIG. 1 is a schematic representation of the overall steering system of the present invention.

In accordance with FIG. 1, a motor vehicle (not represented in more detail) has steerable front wheels 1 which are coupled to one another via steering rods 2 and a rack 3 in such a way that the steering can be adjusted. The rack 3 has a part 3' which is constructed as a gear rack and meshes with a pinion 4, as well as a part 3" constructed as the piston rod of a double-acting hydraulic piston-cylinder unit 5.

The pinion 4 is connected to one side of a clutch 6 which operates in a force-close and/or self-close manner and is continuously loaded in the closing direction by a spring unit 7, and can be opened or held open against the force of the spring unit 7 by feeding hydraulic medium into a hydraulic displacer unit 8. The other side of the clutch 6 is connected in drive terms to a steering handwheel 10 via a preferably articulated shaft 9.

The pressure in the displacer unit 8 can be monitored by a pressure sensor 108.

Arranged in parallel with the steering handwheel 10 is a non-self-locking electric motor 11 which is positively coupled mechanically to the shaft 9, is capable of operating as a pure force generator when the motor shaft is restrained, and whose purpose is explained below. Furthermore, there is arranged on the shaft 9 or between parts of the shaft 9 or between the steering handwheel 10 and the shaft 9 a torque sensor 12 whose signals reproduce the hand force effective on the steering handwheel 10.

Furthermore, there is assigned to the steering hand wheel or the handwheel-side region of the shaft 9 an angle sensor 13 which undertakes the function of a steering angle desired-value sensor in a way represented below.

Provided on the side of the clutch 6 assigned to the steerable front wheels 1 is a sensor 14 whose signals reproduce the actual value of the steering angle of the front wheels 1. For this purpose, the sensor 14 can, for example, detect the stroke of the rack 3 analogous to the actual value of the steering angle.

A sensor 15 is assigned to the clutch 6 detects the operational state of the clutch 6, provision preferably being made for the signals of the sensor 15 to indicate whether the displacer unit 8 adopts its state assigned to the open position of the clutch 6.

The displacer unit 8 can be connected via a switchover valve 16 to a relatively unpressurized reservoir 17 or a hydraulic accumulator 18 whose pressure is detected by a pressure sensor 118. The switchover valve 16 normally assumes the position represented in FIG. 1 and, by applying current to its operating magnet, it is possible for it to be switched over into the position connecting the accumulator 18 to the displacer unit 8.

A pressure-limiting valve 19 leading to the reservoir 17 is provided to safeguard the accumulator 18.

A non-return valve 20, which is open only when flow is in the direction of the accumulator 18, and a control valve 21 can be used to connect the accumulator 18 to the pressure side of a hydraulic pump 22 which, depending on the position of the control valve 21, is connected on the pressure side either to the accumulator 18 or to a level-controlling system 23 (not represented in more detail) by way of which the ground clearance of the vehicle can be varied or controlled.

The two sides of the piston-cylinder unit 5 can be connected to one another via a normally open shutoff valve 24 in such a way that the piston-cylinder unit 5 is switched to freewheeling operation in all circumstances. The shutoff valve 24 is brought into its closed position by applying current to its operating magnet.

Furthermore, the piston-cylinder unit 5 is connected to two connections of a control valve 25 which is connected via two further connections to the reservoir 17 and, respectively, to the pressure side of a further hydraulic pump 26. In the represented position normally adopted by the control valve 25, the piston-cylinder unit 5 is switched to freewheeling. By applying current to one of its operating magnets, the control valve 25 can be controlled in such a way that when the pump 26 is operating a greater or lesser pressure difference occurs between the two sides of the piston-cylinder unit 5, and the piston-cylinder unit 5 generates an appropriate actuating force in one direction or the other. The pressure difference, and thus the actuating force, can be detected with the aid of pressure sensors 29, 30 on both sides of the unit 5.

An electronic regulating or control arrangement 28 is connected on the input side to a pressure sensor 27 which detects the hydraulic pressure on the pressure side of the pump 26, and to the sensors 12 to 15, 29 and 30, as well as sensors 108 and 118. On the output side, the control arrangement 28 controls the electric motor 11 and the operating magnets of the valves 16, 21, 24 and 25 as well as, as the case may be, the pump 22.

Normal operation of the system shown in FIG. 1 will firstly be represented. In this case, the pump 22 has charged the accumulator 18 to the operating pressure monitored by the sensor 118 by at least temporarily switching over the control valve 21 into the position not represented in FIG. 1, or the accumulator 18 is being recharged, as the case may be. The switchover valve 16 likewise assumes the position not represented, with the result that the displacer unit 8 and the accumulator 18 communicate with one another, and the clutch 6 is held in the open position counter to the force of the spring unit 7. Consequently, the steering handwheel 10 and the steered front wheels 1 are mechanically decoupled from one another.

The steering of the front wheels 1 is actuated by using the steering handwheel 10 to actuate the angle sensor 13, which relays to the control arrangement 28 a signal reproducing the steering angle desired value. The control arrangement 28 receives from the sensor 14 a signal reproducing the steering angle actual value. The control arrangement 28 carries out a desired/actual value comparison and controls the control valve 25 as a function thereof. Since, moreover, in normal operation the control arrangement 28 applies current to the operating magnet of the shutoff valve 24 so that the shutoff valve 24 assumes its closed position, the actuation of the control valve 25 of the piston-cylinder unit 5 produces a greater or lesser actuating force with a controllable sense of direction in such a way that the desired/actual value deviation is compensated and the actual value of the steering angle at the front wheels 1 corresponds to the steering angle desired value prescribed by the steering handwheel via the angular resolver 13.

The signals of the pressure sensors 29, 30 assigned to the two sides of the piston-cylinder unit 5 can be used to detect the amount and direction of the pressure difference present between these two sides. This pressure difference is a variable analogous to the steering and disturbing forces active at the front wheels 1. The control arrangement 28 now prescribes in correlation with these steering and disturbing forces a desired value for the hand force which can be felt at the steering handwheel 10, the actual value of which can be determined by the control arrangement from the signals of the torque sensor 12. The electric motor 11 is controlled as a function of a desired/actual value comparison, so that the hand force which can be felt at the steering handwheel 10 is varied as a result in accordance with the steering and disturbing forces active at the steered front wheels 1.

The control arrangement 28 continuously checks itself and also the system parts cooperating with it for correct functioning, the plausibility of the signals of the various sensors also being monitored.

If the safety of the steering system can no longer be ensured with certainty in the case of the normal operation described above, the operating magnets of the valves 16, 21 as well as 24 and 25 are switched off-circuit. The result of this is, on one hand, that the displacer unit 8 of the clutch 6 is depressurized, and the clutch 6 closes. Consequently, the steering handwheel 10 and the steerable front wheels 1 are positively coupled to one another mechanically for the purpose of steering adjustment. On the other hand, the shutoff valve 24, which is now open, or the valve 25, which is in an open middle position, ensure that the piston-cylinder unit 5 is switched hydraulically to freewheeling.

The normal operation of the steering system is terminated, for example, whenever the pressure, detected by the sensor 118, of the accumulator 18 drops below a threshold value. In the case of such a pressure drop, there is the risk that the clutch 6 can no longer be opened or held open reliably by feeding pressure into the displacer unit 8, and that an undefined state will be set up. Consequently, it is preferably provided that the valve 16 is switched into the position represented or is held in the position represented when the sensor 118 signals a pressure below the threshold value. This amounts to the same thing as the operating magnet of the valve 16 being switched, or remaining, off-circuit electrically.

If sufficient residual functions of the controller 28 are still available after termination of normal operation, the electric motor 11 can now be used as servomotor: the signals of the torque sensor 12, if present, specify the hand force active at the steering handwheel 10. Depending on this hand force, the electric motor 11 can be controlled by the controller 28 so as to achieve a greater or lesser reduction in the hand forces required for the respective steering maneuvers.

The piston-cylinder unit 5 can also be operated as a servomotor when the clutch 6 is closed, that is in the case of mechanical positive coupling of the steering handwheel 10 and steered front wheels 1. For this purpose, the electromagnet of the shutoff valve 24 must have current applied in conjunction with closure of this valve, and the control valve 25 must be actuated as a function of the signals of the torque sensor 12 by the controller 28 in such a way that the piston-cylinder unit 5 produces an actuating force which reduces the hand force respectively required at the steering handwheel 11.

Figure 2:
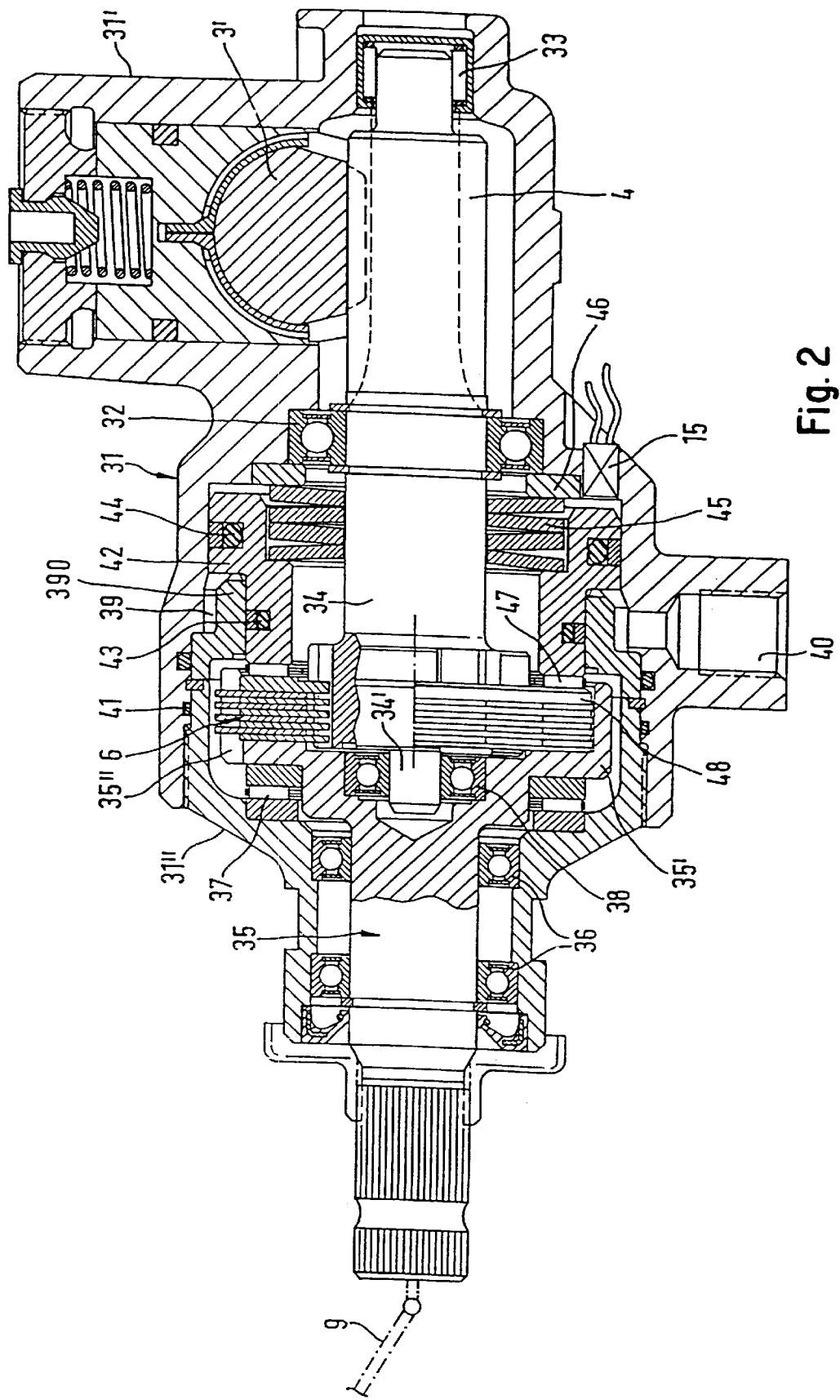
FIG. 2 is a cross-sectional longitudinal view through a gear arrangement having a pinion, a gear rack and a clutch assigned to the pinion.

FIG. 2 shows a particularly preferred embodiment of the clutch 6 which is accommodated, together with the pinion 4 and the meshing part of the gear rack 3' in a common housing arrangement.

In a basically conventional way, in FIG. 2 the gear rack 3' is displaceably guided in a part 31' of a housing 31 which also holds the pinion 4, meshing with the gear rack 3', and the bearings 32, 33 thereof.

On the side of the bearing 32 averted from the pinion 4, the pinion 4 is adjoined in one piece by a pinion shaft 34 to whose free end an axial extension 34' is attached. For the remainder, the end region, adjacent to the extension 34', of the pinion shaft 34 is of eccentric construction, for example provided with axial webs, with the result that the pinion shaft 34 can be coupled securely as regards rotation to inner plates of the clutch 6 which can be displaced axially on the eccentric section.

Rotatably mounted on the same axis as the pinion shaft 34 in a housing part 31" adjacent to the housing part 31' is a shaft 35 which is connected securely as regards rotation to the shaft 9 (not represented in FIG. 2) shown in FIG. 1.

The shaft 35 is mounted radially and axially in the housing part 31" with the aid of bearings 36, 37, the axial bearing 37 preventing a leftward displacement of the shaft 35, and the left-hand bearing 36 preventing in conjunction with a snap ring arranged on the shaft 35 and an annular stage on the housing part 31", a rightward displacement of the shaft 35. Moreover, the shaft 35 holds in a bell-like end region on the right side in FIG. 2 a radial bearing 38 with the aid of which the pinion shaft 34 is radially mounted, via its extension 34', on the shaft 35.

Furthermore, the right-hand end of the shaft 35 is formed by a hollow wheel 35' which is integrally formed on it and surrounds the plates of the clutch 6 radially on the outside, and is connected to the outer plates of this clutch securely as regards rotation but in an axially movable fashion. Arranged for this purpose in the hollow wheel 35' is an axial slot 35" in which the outer plates engage with corresponding radial extensions. If appropriate, it is also possible for multiply arranged slots 35" to cooperate with radial extensions, arranged in a corresponding multiple fashion, on the outer plates.

Constructed in the housing part 31' is an annular space 39 which surrounds a cylindrical sleeve 390 and can be connected via a hydraulic connection 40 to the valve 16 shown in FIG. 1. This annular space 39 is sealed at the left-hand end in FIG. 2 by a sealing ring 41 which shuts off the gap between the housing part 31' and the sleeve 390. The other end, open at the front face, of the annular space 39 is sealed by a cylindrical piston 42 which is sealed with respect to the inner circumferential surface of the sleeve 390 at a section having a smaller outside diameter by a piston packing 43, and is sealed at a section having a larger outside diameter with respect to the inner circumferential surface of the housing part 31' with the aid of a further piston packing 44.

The cylindrical piston 42 is forced to the left in FIG. 2 by an annular cup-spring pack 45 which is arranged concentrically with the pinion shaft 34. On one hand, the cup-spring pack 45 is supported axially on an abutment ring 46 which is arranged inside an annular stage in the interior of the housing part 31' and serves, moreover, to retain the outer bearing shell of the bearing 32 of the pinion 4 axially inside an annular stage of the housing part 31'. The other end of the cup-spring pack 45 is clamped against an annular stage on the inner circumference of the cylindrical piston 42.

Arranged on the end face, on the left in FIG. 2, of the cylindrical piston 42 are an axial bearing 47 as well as a thrust plate 48 which is separated from the cylindrical piston 42 by the axial bearing 47 and, in the case of an unpressurized annular space 39 transmits the thrusts exerted by the cup-spring pack 45 on the cylindrical piston 42 to the plate pack of the clutch 6. As a result, the outer and inner plates of the clutch 6 are forced firmly against one another axially and the clutch 6 is closed, the axial thrusts exerted on the clutch 6 being transferred to the housing part 31" via the axial bearing 37.

If hydraulic medium is fed at sufficient pressure into the annular space 39, which forms the displacer unit of FIG. 1 together with the cylindrical piston 42, the cylindrical piston 42 is displaced to the right in FIG. 2 counter to the force of the cup-spring pack 45, and the clutch 6 is opened. The end position, displaced to the right, of the cylindrical piston 42 is detected by the sensor 15 and signalled to the controller 28 of FIG. 1.

It may be seen from FIG. 2 that only a little overall space is required for the clutch 6, and the housing 31 holding the clutch 6 can be integrated in a housing which is provided in any case for holding the pinion 4 and gear rack 3'.

The control arrangement 28 can communicate with further sensors and/or computers (not represented) in order to take account of additional parameters.

In the embodiment in FIG. 3, the clutch 6 is opened counter to the force of the closing spring 7 by a non-self-locking electromagnet unit 208 as soon as an appropriate electric current is applied to this unit 208.

The control arrangement 28 comprises a measuring circuit 280 with the aid of which parameters of the current applied to the electromagnet unit 208 can be detected, for example the electric voltage and current intensity of the electric supply current led to the electromagnet unit 208 as well as, if appropriate, the inductance of the electromagnet unit 208.

As soon as the current intensity or electric power of the supply current of the electromagnet unit 208 exceeds a prescribed threshold value, the control circuit 28 can interpret this as a signal for the fact that the clutch 6 is being held in the open position by the electromagnet unit 208. It is possible, in addition, for a signal of the sensor 15 for an open clutch to be present.

It can be provided for safety reasons that the state of "open clutch" is held to obtain only when the measuring circuit 280 and the sensor 15 emit mutually corresponding signals.

Should this not be the case, or should the signal of the measuring circuit 280 and/or of the sensor 15 indicate a closed or closing clutch, the steering system is immediately switched over to abnormal operation or emergency operation in which the electric power supply of the electromagnet unit 208 is interrupted or switched off, and the clutch 6 correspondingly assumes its state closed by the spring 7.

The invention is not limited to steering systems having steering handwheels. Fundamentally, instead of a steering handwheel it is also possible in principle for any steering handle, for example a joystick, to be used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering system for a non-trackbound motor vehicle having steered vehicle wheels which are operationally connected in normal operation to a steering device comprising an electronic control arrangement configured to continuously check for correct functioning and controls a steering actuator and being connected with the steered vehicle wheels to a steering angle desired-value sensor actuated by the steering device as well as to a steering angle actual-value sensor actuated by the steered vehicle wheels, and being further configured to control a hand-force setter connected to the steering device to simulate a steering resistance by being operatively connected to a hand-force desired-value sensor detecting transmitted forces between the steering actuator and steered vehicle wheels, and to a hand-force actual-value sensor detecting transmitted forces between the hand-force setter and steering device, whereby with abnormal or emergency operation, the steered vehicle wheels are mechanically positively coupled to the steering device for steering adjustment by closure of a normally open clutch in a mechanical steering gear arrangement arranged between the steering device and steered vehicle wheels, and a sensor system is operatively arranged to detect an open state of the clutch.

2. The steering system according to claim 1, wherein the control arrangement is configured to effect an automatic switchover to abnormal emergency operation when, during normal operation, at least one of a signal for the open state of the clutch vanishes and a signal for a closed or closing clutch occurs.

3. The steering system according to claim 1, wherein the clutch is arranged to be continuously subjected to a closing force and opened against the closing force by an actuator.

4. The steering system according to claim 1, wherein the clutch is operatively connected with an electromagnetic actuator.

5. The steering system according to claim 1, wherein the clutch is operatively connected with a fluidic actuator.

6. The steering system according to claim 3, wherein, in order to generate a signal for an open clutch, the sensor system is configured to detect an operating state of the actuator.

7. The steering system according to claim 1, wherein the steering gear arrangement comprises a gear operatively associated with the steerable vehicle wheels, an input-side part and an output-side shaft part, and the clutch is operatively arranged in one of a bearing housing of the shaft parts and in a housing unit also including the bearings of a gearwheel or pinion arranged on a shaft part, and the housing or housing unit holds a spring unit, applied to the clutch in the closing direction, and a hydraulic displacer unit has a displacer arranged as a force-transmitting part between the clutch and spring unit and is displaceable by feeding hydraulic pressure into the displacer unit while opening the clutch counter to the spring arrangement.

8. The steering system according to claim 1, wherein the steering gear arrangement is a rack and pinion steering arrangement, and the clutch is accommodated in a housing holding the pinion between a pinion shaft and a shaft which is connectable to the steering device.

9. The steering system according to claim 1, wherein the clutch substantively operates only in a force-closed manner.

10. The steering system according to claim 9, wherein the clutch is a multi-plate clutch having plates arranged concentrically with one shaft part and operatively cooperate with a cylindrical piston concentric with the shaft part which, via a cup-spring pack concentric with the shaft part, is clampable against the plates which are supported against an abutment surface on a further shaft part.

11. The steering system according to claim 10, wherein the plates of the clutch are arranged inside a hollow wheel on the further shaft part, the hollow wheel being rotationally fixed and axially movable relative to outer plates of the clutch, and the one shaft part being rotationally fixed and axially movable relative to inner plates of the clutch.

12. The steering system according to claim 10, wherein an axial bearing is arranged between the cylindrical piston and the clutch plates.

13. The steering system according to claim 10, wherein an annular space between housing parts is sealed at one end by the housing parts and at the other end by the cylindrical piston, whereby hydraulic pressure active in the annular space tends to displace the cylindrical piston counter to a force of the cup-spring pack.

14. The steering system according to claim 1, wherein a hydraulic displacer unit of the clutch is arranged to be continuously held in an unpressurized state via a valve, or is connected to a relatively unpressurized hydraulic reservoir when a pressure of a pressure source associated with the displacer unit is below a threshold value.

* * * * *